US006219358B1

United States Patent
Pinder et al.

(10) Patent No.: US 6,219,358 B1
(45) Date of Patent: Apr. 17, 2001

(54) ADAPTIVE RATE CONTROL FOR INSERTION OF DATA INTO ARBITRARY BIT RATE DATA STREAMS

(75) Inventors: Howard G. Pinder, Norcross; Andrew O. Kelly, Gainesville, both of GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/151,868

(22) Filed: Sep. 11, 1998

(51) Int. Cl.[7] ........................................................ H04J 3/02
(52) U.S. Cl. ............................................. 370/537; 348/423
(58) Field of Search ................................... 370/532–544; 348/6, 7, 385, 388, 390, 423

(56) References Cited

U.S. PATENT DOCUMENTS

| 5,682,195 | 10/1997 | Lappington et al. . |
| 5,835,493 | 11/1998 | Johnson et al. . |

FOREIGN PATENT DOCUMENTS

| 0 743 795 A2 | 11/1996 | (EP) . |
| 0 781 002 A2 | 6/1997 | (EP) . |
| 0 805 598 A1 | 11/1997 | (EP) . |
| 0 924 931 A2 | 6/1999 | (EP) . |
| WO 98/23093 | 5/1998 | (WO) . |

OTHER PUBLICATIONS

Bungum, O.W., Transmultiplexing, Transcontrol and Transscrambling of MPEG–/DVB Signal, International Broadcasting Convention, Sep. 12, 1996, pp. 288–293.

Biere, D., "A Flexible and Modular Approach for Transmission of Digital TV and for Interactive Services," International Broadcasting Convention, Sep. 14, 1995, pp. 195–201.

Yoshida, J., "Data–injection system adds broadcast flexibility," *Electronic Engineering Times*, Sep. 14, 1998, pp. 19–20.

Primary Examiner—David R. Vincent
(74) Attorney, Agent, or Firm—Kelly A. Gardner; Kenneth M. Massaroni; Hubert J. Barnhardt, III

(57) ABSTRACT

The rate of insertion of data, such as MPEG table packets, into an outgoing bit stream is varied by a packet handler. The packet handler, which is located in a modulator in a cable television system headend, comprises control logic and a packet router. The actual insertion rate of the outgoing data is based on the bit stream's available capacity for insertion of data and the desired insertion rate of the data. When the available capacity for insertion equals or exceeds the desired insertion rate, the actual insertion rate equals the desired insertion rate. When the available capacity for insertion is less than the desired insertion rate, the actual insertion rate is reduced from the desired insertion rate. The present invention dynamically determines the available capacity for insertion and adjusts the actual insertion rate.

35 Claims, 9 Drawing Sheets

ADAPTIVE RATE CONTROL FOR INSERTION OF DATA INTO ARBITRARY BIT RATE DATA STREAMS

FIELD OF THE INVENTION

This invention relates generally to the insertion of data into a bit stream, and more particularly relates to the variable rate insertion of MPEG table data in systems delivering Moving Pictures Experts Group (MPEG) formatted data signals to system subscribers.

BACKGROUND OF THE INVENTION

Television systems transmit television signals to system subscribers. Television systems such as cable and satellite television systems typically include a headend for receiving programming from various sources and redistributing the programming to subscribers. The headend receives programming signals from a variety of sources, combines the programming signals from the various sources, and transmits the combined signals to subscriber equipment. The distribution system can include a variety of media, such as coaxial cable, fiber optic cable, and satellite links. In a cable television system, the subscriber equipment, which receives the signals from the headend, can include to a cable-ready television, a cable-ready video cassette recorder (VCR), or a home communications terminal (HCT) that is connected to a television, computer, or other display device.

The headend uses modulators to control the stream of data into the distribution system. In today's competitive market, the modulators must be able to accept data from equipment manufactured by many different suppliers. Increasingly, the headend is receiving and transmitting programming in a digital (e.g., MPEG) format.

MPEG bit streams include overhead information such as MPEG tables that indicate the types and location of the programming included in the bit stream. In a local television system, the MPEG tables include information that is specific to that local distribution system and its particular channel line-up. MPEG as referenced in this application is described in the MPEG-1 and MPEG-2 standards. The MPEG-1 standards (ISO/IEC 11172) and the MPEG-2 standards (ISO/IEC 13818) are described in detail in the International Organization for Standardization document ISO/IEC JTC1/SC29/WG11 N (June 1996 for MPEG-1 and July 1996 for MPEG-2), which is hereby incorporated by reference.

In designing a system, a decision is made as to what and how much information is to be included in a bit stream. Maximizing the bit rate, or the amount of information, is an economic decision. For example, the efficient use of all of the available throughput of a modulator minimizes the number of modulators required. The maximum bit rate is determined by the maximum throughput of the modulator and the maximum amount of programming and overhead information in a bit stream. The maximum bit rate is set to be as close as possible to the modulator's throughput. In a fixed bit rate system such as an MPEG system, the modulator throughput is designed to be the fixed bit rate of the system. The only remaining variable is the amount of information in the bit stream. A system is designed using the maximum size of the information or programming when determining what information is in a particular bit stream. The actual amount or size of the information in a bit stream varies with time, but should never exceed the maximum size. Thus, some of the capacity of a bit stream will be unused when a program uses less than its maximum bit rate.

In a closed system, which uses a single equipment supplier for the majority of the equipment, the amount of information in the bit stream is based on the input source and the other equipment conforms to the format of that input source. Thus the amount of overhead information is set at an input source for the system. The overhead information designates such things as the channel line-up, program data sequence, and encryption information. In a closed system the overhead information output from a headend to a distribution system must be the same size as those from the input source. The outgoing overhead information is a combination of some of the incoming overhead information, some modified incoming overhead information, and some information that is specific to the local distribution system. As the size is fixed, some of the incoming overhead information is deleted to allow for the distribution system specific information. Changes in the content of the overhead information in a closed system are scheduled and planned.

In a system where there are multiple input sources, the size of the overhead information to be inserted into the outgoing bit stream may be larger than the overhead information from the input sources. The overhead information can be larger due to such things as the insertion of MPEG tables designating multiple input sources, larger channel line-ups, additional system information, and local distribution system specific conditional access information. The various inputs are designed to fill a modulator's output data stream and this additional local distribution system specific overhead information can exceed the capacity of the output data stream. An example of this problem is illustrated in a system having a bit stream with local distribution system specific overhead information of 327 Kbps to be inserted and an average available capacity for insertion of only 300 Kbps. While the overhead information to be inserted may not change often, the instantaneous available capacity for insertion can change often. The available capacity can change due to any of a number of reasons, such as programming that is only transmitted during the day. At night the unused capacity of the daytime programming could accommodate the additional 27 Kbps required in the above example. Prior art systems do not provide a real time mechanism for evaluating the available capacity for insertion and adjusting the insertion rate of overhead information.

Thus, what is needed is a method and apparatus for determining the available capacity for insertion of an outgoing bit stream and varying the rate of data insertion into the outgoing bit stream based on the available capacity.

SUMMARY OF INVENTION

Generally described, the present invention provides a method for adaptively controlling the rate of data insertion into an outgoing bit stream. The method includes determining an available capacity for insertion of data into an outgoing bit stream and a desired insertion rate of said data into said outgoing bit stream. An actual insertion rate is then determined based on the available capacity for insertion and the desired insertion rate. The data is inserted into the outgoing bit stream at the actual insertion rate.

In another aspect, the present invention provides an apparatus for adaptively controlling the rate of insertion of outgoing MPEG table packets into an outgoing MPEG bit stream. The apparatus includes an input buffer, a packet handler, and an output buffer. The input buffer receives the incoming MPEG bit stream. The packet handler routes MPEG packets from the input buffer to the output buffer, determines and adjusts the rate of insertion of the MPEG table packets, and inserts MPEG table packets into the outgoing MPEG bit stream. The output buffer buffers the outgoing MPEG bit stream.

The present invention also provides a system for adaptive rate control of outgoing MPEG table packets insertion into an outgoing MPEG bit stream. The system includes an input source, encoding equipment, a distribution system, and decoding equipment. The input source for provides a signal to the system. The encoding equipment encodes signals into a bit stream for the system. The distribution system transmits the bit stream. The decoding equipment decodes the bit stream into a form usable by a system subscriber. The system also includes means for determining an available capacity for insertion of data into the bit stream, determining a desired insertion rate of the data, and varying the actual insertion rate of the data.

These and other aspects of the present invention may be more clearly understood from a review of the following detailed description and the appended drawings and claims.

DETAILED DESCRIPTION

Figure 1:
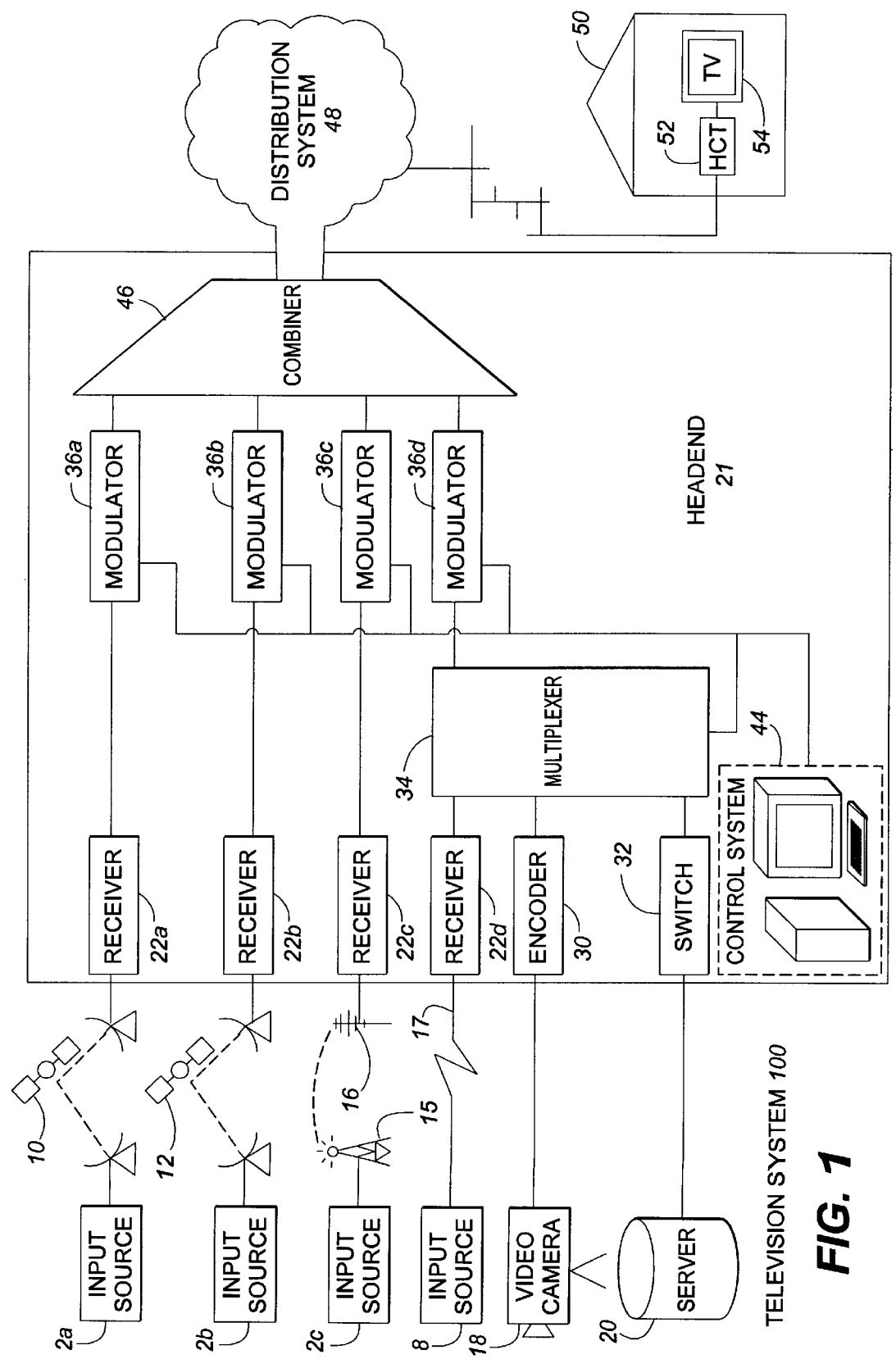
FIG. 1 is a block diagram of a cable television system in which the present invention may be employed.

The present invention provides a method and apparatus for adaptive control of the rate of data insertion into an outgoing bit stream, based on the available capacity for insertion into the bit stream. In an exemplary embodiment, the present invention provides a dynamic method for adaptively controlling the rate of MPEG table insertion. This embodiment includes a packet handler, an input buffer, and an output buffer. The packet handler, which includes control logic and a packet router, determines the available capacity for insertion into the bit stream, varies the insertion rate based on the available capacity, and inserts the data into the bit stream. Several methods for adjusting the insertion rate are described below.

Referring now to the drawings, in which like numerals represent like elements throughout the several figures, the present invention and an exemplary operating environment will be described.

Television System Overview

FIG. 1 illustrates various aspects of an exemplary television system in which the present invention is designed to operate. The present invention relates to the insertion of data into a bit stream and is described in the context of digital equipment that forms a part of a television system. Those skilled in the art will appreciate that although analog equipment is not described below, the present invention may be used in television systems that employ both digital and analog equipment.

The television system 100 includes a headend 21, which receives input programming from multiple input sources. The headend 21 combines the programming from the various sources and distributes the programming to subscriber locations (e.g., subscriber location 50) via distribution system 48.

In a typical system, the headend 21 receives programming from a variety of sources 2a, 2b, 2c. The programming signals may be transmitted from the source to the headend via a variety of transmission paths, including satellite 10, 12, and terrestrial broadcast 15, 16. The headend can also receive programming from a direct feed source 8 via a direct line 17. Other input sources include a video camera 18 or a server 20. The signals provided by the programming sources can include a single program or a multiplex that includes several programs.

Programmers and television system operators both employ forms of conditional access, or encryption, to prevent piracy and ensure that their signals are only being received by those that have subscribed to and paid for their services. For example, programmers employ conditional access to ensure that their transmissions are only decrypted by those television system operators that pay for their programming. Similarly, television system operators can use conditional access to prevent "pirates" from receiving premium channels or pay per view programming that they have not paid for. Thus, a signal from a programmer may be decoded using "incoming" conditional access, and then encoded for transmission to the subscribers using "outgoing" conditional access. An example of a conditional access system that may be used in television system 100 is disclosed in commonly assigned, co-pending U.S. patent application Ser. No. 60/054,575 filed Aug. 1, 1997, entitled Conditional Access System, the disclosure of which is incorporated herein by reference.

The headend 21 includes a plurality of receivers 22a, 22b, 22c, 22d that are each associated with an input source. MPEG encoders such as encoder 30, are included for encoding such things as local programming or a video camera 18 feed. A switch 32 provides access to server 20, which could be a Pay-Per-View server, a data server, an internet router, a network system, or a phone system. Some of the signals may require additional processing, such as signal multiplexing prior to being modulated. Such multiplexing is done by multiplexer 34.

The headend 21 contains a plurality of modulators, 36a, 36b, 36c, and 36d, for interfacing to the distribution system 48. The modulators convert the received programming information into a modulated output signal suitable for transmission over the distribution system 48. The output signals from the modulators are combined, using equipment such as a combiner 46, for input into the distribution system 48.

A control system 44 allows the television system operator to control and monitor the functions and performance of the television system 100. The control system 44 interfaces, monitors, and/or controls a variety of functions, including the channel lineup for the television system, billing for each subscriber, and conditional access for programming distributed to subscribers. Control system 44 provides input to the modulators for setting their operating parameters, such as system specific MPEG table packet organization or conditional access information. The control system 44 can be located at headend 21 or remotely.

The distribution system 48 distributes signals from the headend 21 to subscriber locations, such as subscriber location 50. The distribution system 48 could be an optical fiber network, a coaxial cable network, a hybrid fiber-coaxial network, a satellite system, or a direct broadcast system. There is a multitude of subscriber locations connected to distribution system 48. At subscriber location 50, a decoder 52, such as a home communications terminal (HCT) decodes the signals for display on a display device, such as on a television set (TV) 54 or a computer monitor. Those skilled in the art will appreciate that the signal can be decoded in a variety of equipment, including an HCT, a computer, a TV, a monitor, or satellite dish.

In an exemplary embodiment, the present invention is located within one or more modulators in the headend.

Moving Pictures Experts Group (MPEG) Overview

Figure 2:
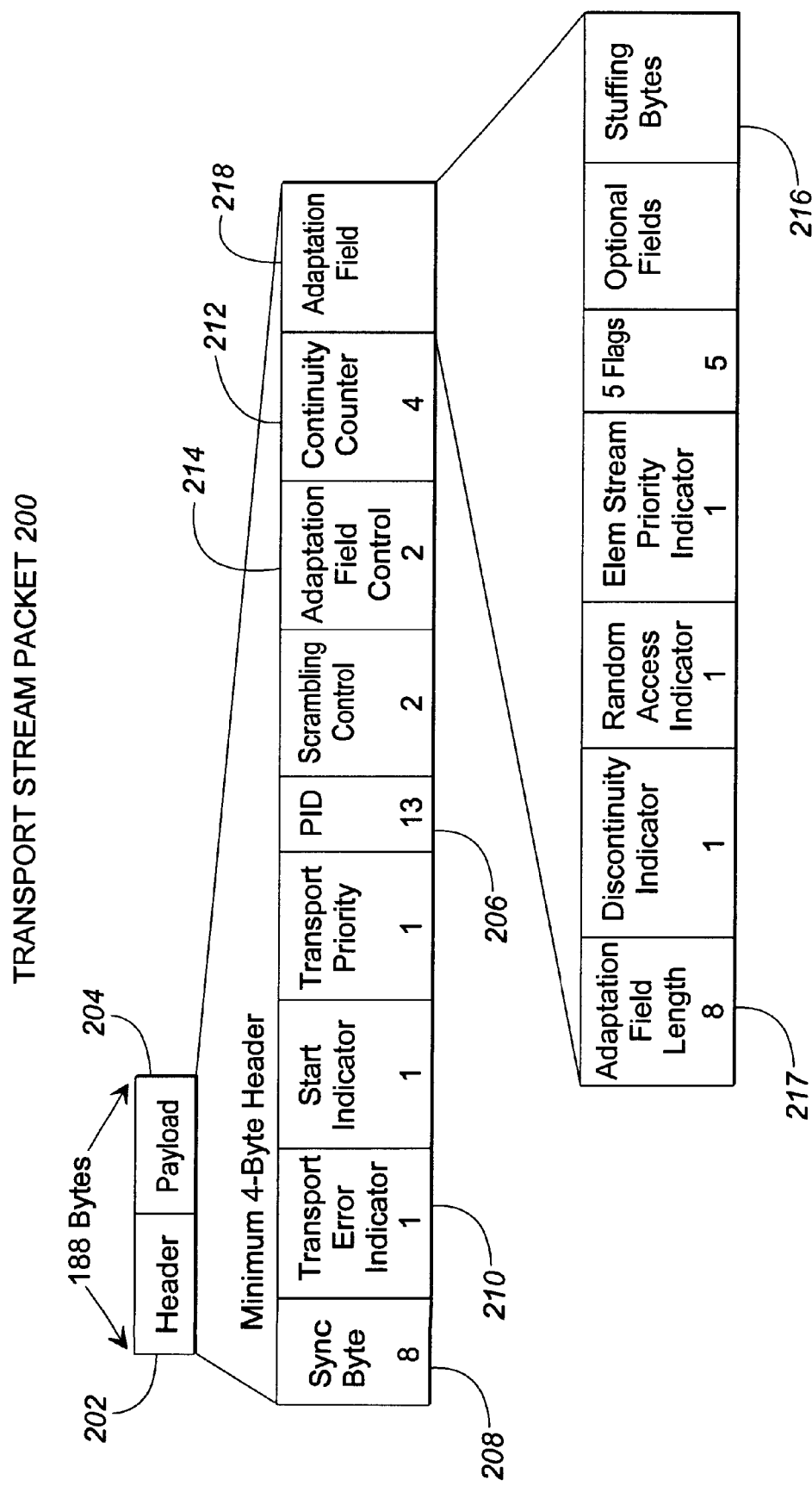
FIG. 2 is a block diagram representation of an MPEG transport packet.
Figure 3:
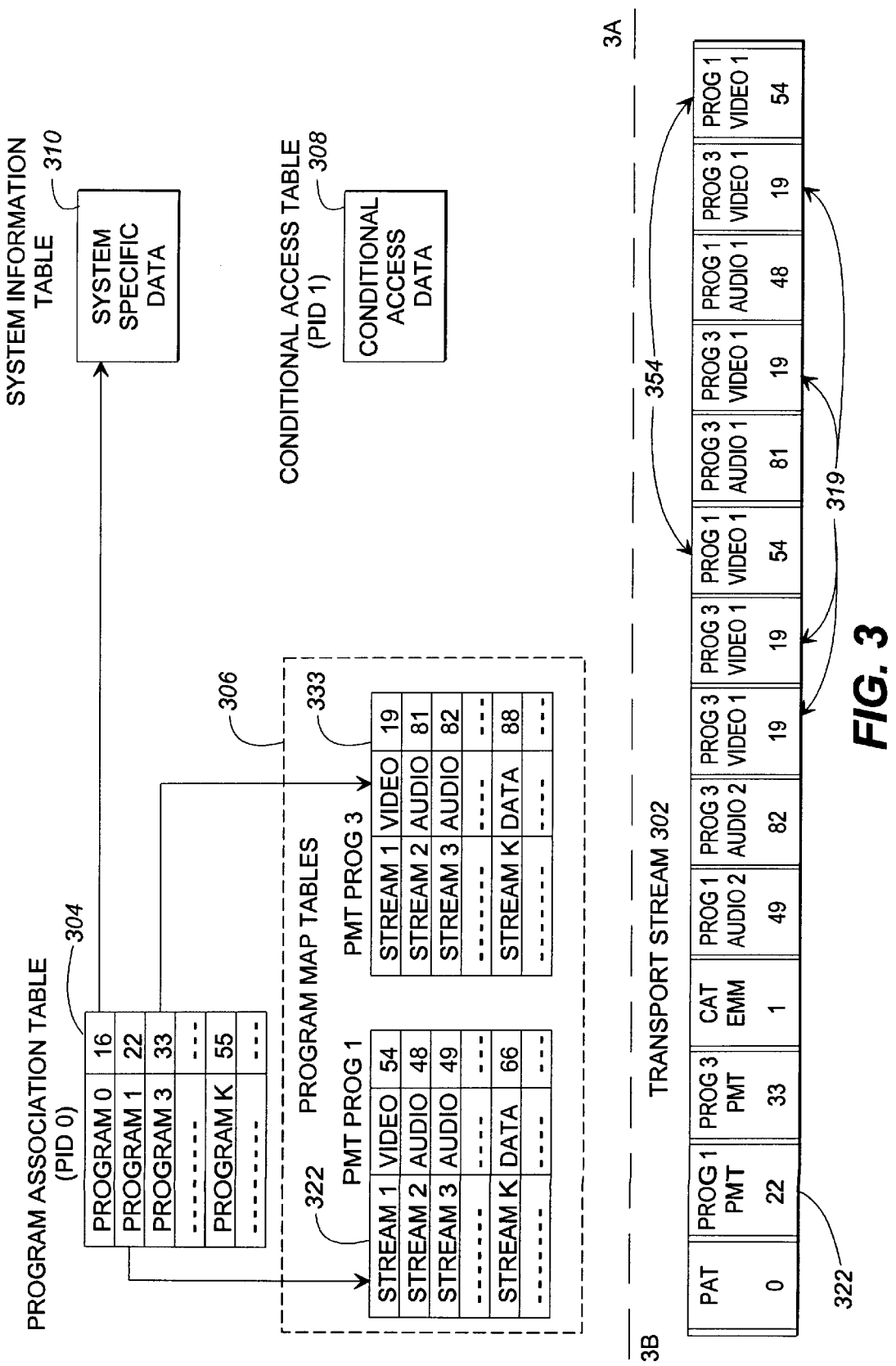
FIG. 3, consisting of FIG. 3A and FIG. 3B, illustrates the relationship between MPEG tables and an MPEG transport stream.

The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1 and MPEG-2 standards are hereinafter referred to as MPEG. In an MPEG encoded transmission, programming and other data are transmitted in packets, which collectively make up a transport stream. An MPEG transport stream includes table packets, which provide information about the organization of the transport stream and about any conditional access scheme that is used. Additional information regarding transport stream packets, the composition of the transport stream, types of MPEG tables, and other aspects of the MPEG standards are described below. In addition, FIG. 2 and FIG. 3 provide a graphical representation of MPEG information. In an exemplary embodiment, the present invention employs MPEG table packets. However, the present invention is not so limited, and can be implemented using other types of data.

As mentioned above, an MPEG transport stream is made of packets, where each packet is identified by a packet identifier (PID). All of the packets associated with a single elementary stream will include the same PID. In general, table packets are used to indicate which PIDs are associated with each program in the transport stream. So, for example, a table packet might indicate that the transport stream includes two programs, where program 1 consists of video packets with a PID of 31 and audio packets with a PID of 32, and program 2 consists of video packets with a PID of 45 and audio packets with a PID of 48. Additional information regarding the makeup of an MPEG transport stream and its various components is provided below.

Packetized Elementary Stream (PES)

The output of a single MPEG audio or video encoder 30 (of FIG. 1) is an Elementary Stream, which is an endless, near-real-time signal. The Elementary Stream is broken into packets in what is referred to as a Packetized Elementary Stream (PES). These packets include header information to identify the start of the packets and must include time stamps because packetizing disrupts the time axis.

Program Stream (PS)

One video PES and a number of audio PESs can be combined to form a Program Stream (PS), provided that all of the encoders are locked to a common clock. Time stamps in each PES ensure correct correlation or lip-sync between the video and audio. Program Streams have variable-length packets with headers.

Transport Stream Packet

A Transport Stream is a multiplex that includes several Program Streams, which are transported in fixed size, 188 byte, transport stream packets 200 (FIG. 2). FIG. 2 illustrates a transport stream packet 200, including a minimum 4 Byte header 202 and a payload 204. The header 202 is further expanded to illustrate the parts thereof. The numbers at the bottom of the cells, such as the 8 in Sync Byte cell 208, indicate the fixed bit size of the cell. Cells with no number, such as payload 204, do not have a fixed size. In header 202, the most important information is:

Sync byte cell 208, which is recognized by a de-multiplexer or decoder so that header 202 and payload 204 can be de-serialized.

Transport error indicator cell 210, which is set if the error correction layer above the transport layer is experiencing a raw bit error rate (BER) that is too high to be correctable. It indicates that the packet may contain errors.

Packet Identifier (PID) cell 206, which is a thirteen-bit code used by a de-multiplexer or decoder to distinguish between different types of packets.

Continuity counter cell 212, which is a four-bit value that is incremented by the encoder as each new packet having the same PID is sent. It is used to determine if any packets are lost, repeated, or out of sequence.

Header 202 also includes a start indicator cell, a transport priority cell, a scrambling control cell, an adaptation field control cell 214, and an adaptation field cell 218. Included within the adaptation field cell 218 is an adaptation field length cell 217, a discontinuity indicator cell, a random access indicator cell, an elementary stream priority indicator cell, a 5 flags cell, an optional fields cell, and a Stuffing Bytes cell 216.

In some cases more information is needed in header 202. The header can be expanded using adaptation field cell 218. If header 202 is expanded, payload 204 becomes smaller to maintain the fixed packet size of 188 bytes.

Stuffing Packets

When the required bit rate or packet size is less than the fixed bit rate or fixed packet size, the excess capacity is filled by inserting stuffing. Stuffing can be used in two ways, as stuffing bytes or as a stuffing packet. Stuffing bytes are added to packets with a "partial" payload in order to fill up the remainder of transport stream packet 200 and maintain the fixed packet size. Stuffing bytes can be in the payload 204 or in the Stuffing Bytes cell 216 of an expanded header 202. A stuffing packet, a transport stream packet 200 with only a header and stuffing, can be used in a fixed rate bit stream to maintain the fixed bit rate. The stuffing packet is used to fill unused or excess capacity. Stuffing packets are always assigned a PID of 8191. De-multiplexers and decoders ignore packets thus identified as stuffing packets. Stuffing can be all ones (1), all zeros (0), pseudo-random 1s and 0s, or an ignore flag followed by any of the other options.

Transport Stream (TS)

Several programs and their associated PESs are multiplexed to form a single Transport Stream (TS) 302 (FIG. 3). A Transport Stream 302 differs from a Program Stream in that the PES packets are further subdivided into short fixed-size (i.e., 188 byte) transport stream packets 200 and in that multiple programs encoded with different clocks can be carried. This is possible because a transport stream 302 has a program clock reference (PCR) mechanism that allows transmission of multiple clocks.

The fixed-size transport stream packets 200 of Transport Stream 302 each contain 188 bytes. The transport stream 302 carries many different programs. In advanced applications, each program may use a different compression factor and a bit rate that can change dynamically even though the overall bit rate for Transport Stream 302 stays constant. Called statistical multiplexing, this advanced application allows a program temporally requiring a larger bandwidth to borrow bandwidth from a program that is not using all of its allocated bandwidth. In addition, each video PES could have a different number of audio and data PESs associated with it. With this flexibility in the make-up of Transport Stream 302, a decoder or de-multiplexer must be able to change from one program to the next and correctly select the appropriate audio and data channels. This changing and selecting is facilitated by MPEG tables described herein below.

A Transport Stream 302 is more than just a multiplex of audio and video packets. In addition to the compressed audio, video, and data, Transport Stream 302 includes a great deal of information that describes the bit stream. This information is found in MPEG tables such as Program Specific Information tables or System Information tables, which describe the relationships of the MPEG packets and identify their corresponding packet identifier (PID). Each packet carries a PID 206 (see FIG. 2) located in the packet header 202. The MPEG tables list the PIDs for all packets associated with a particular program. The PIDs are used by the decoder or de-multiplexer to change from one program to the next and correctly select the appropriate audio and data channels.

FIG. 3, including FIG. 3A and FIG. 3B, illustrates the relationship between the transport stream 302, the MPEG packets and tables therein, and the function of PIDs. Illustrative of the function of PIDs, they can be used to locate the associated tables in FIG. 3A or the corresponding packets in FIG. 3B.

FIG. 3A, the upper portion of FIG. 3, represents the different MPEG tables in the MPEG transport stream 302. For example, Program Association Table 304 indicates that all packets with a PID of 22 are Program Map Tables (PMT) associated with program 1. The PMT 322 that has a PID of 22 indicates the PIDs of the packets that make up the various components of the stream associated with program 1.

FIG. 3B, the lower portion of FIG. 3, represents the MPEG packets found in a typical MPEG transport stream 302. The MPEG packets are labeled and display their corresponding PIDs. The PIDs can identify an associated table of FIG. 3A. For example, in FIG. 3b, the packet 320, which has a PID of 22, corresponds to the PMT 322 of FIG. 3A.

Program Specific Information (PSI)

A de-multiplexer or decoder can correctly select packets only if it can correctly associate them with the transport stream 302 to which they belong. A de-multiplexer or decoder can do this task only if it knows what the right PIDs are. This is the function of the Program Specific Information (PSI) tables.

The PSI includes the Program Association Table (PAT) 304, the Conditional Access Table (CAT) 308, and the Program Map Table (PMT). In FIG. 3A two PMTs are shown, Program 1 PMT 322 and Program 3 PMT 333.

The PSI tables are carried in packets having unique PIDs, some of which are standardized and some of which are specified by the PAT 304 and the CAT 308. These table packets must be repeated periodically in every transport stream. The PAT 304 always has a PID of 0, the CAT 308 always has a PID of 1, and stuffing packets always have a PID of 8191. These are the only fixed PIDs in the MPEG system. The de-multiplexer or decoder must determine all of the remaining PIDs by accessing the appropriate table(s).

The Program Association Table (PAT) 304 lists every program in transport stream 302. The PAT 304 identifies the PID for the packets containing the associated Program Map Tables (PMT) 306. For example, PAT 304 identifies all packets with PID 22 as being a PMT 322 associated with program 1.

PIDs of all video, audio and data elementary streams that belong in the same program stream are listed in a PMT 306 with their associated PIDs. For example, PMT 322 lists a video stream, two audio streams, a data stream, and other elementary streams belonging to program 1. PMT 322 also identifies the associated PIDs for each stream, such as PID 54 for all program 1 video streams.

In FIG. 3, the PAT 304 identifies PID 33 for all program 3 PMT 333 packets. In the corresponding PMT 333, elementary stream 1 identifies as a video stream all packets with a PID value of 19. All program 3 video 1 packets, in transport stream 302, have PID 19 as indicated by arrows 319 of FIG. 3B. PMT 322 indicates that all video packets associated with program 1 have PID 54. These packets are indicated by arrows 354 in transport stream 302 of FIG. 3B. The decoder (or a de-multiplexer) can select all data for a given elementary stream by accepting only packets with the right PID, such as PID 19 for elementary stream 1 video, and rejecting the remainder. Data for an entire program can be selected using the PIDs in a PMT. For example, for the entire program 3, using PMT 333, select all video 19 PIDs, audio 81 PIDs, audio 82 PIDs, and data 88 PIDs. Packet-continuity counts ensure that every packet that is needed to decode a stream is received.

Some or all of the programs are protected or tiered so that they can only be viewed by those who have paid a subscription or fee. The transport stream 302 contains conditional access information, Conditional Access Table (CAT) 308, to administer this protection, located at PID 1 and labeled EMM in transport stream 302. The PIDs for Entitlement Management Messages (EMM) are listed in the CAT 308 packets (PID=1).

Consequently, if the decoding of a particular program is required, reference to the PAT 304 and then a PMT 306 is all that is needed to find the PIDs of all of the elementary streams in the program. If the program is encrypted, then access to the CAT 308 may also be necessary.

The first entry in the PAT 304, program 0, indicates the PID of the System Information Table 310.

System Information Table

A given System Information Table 310 contains details of more than just the transport stream 302 carrying it or the PSI of the transport stream. The System Information Table 310 may also include details of other transport streams that may be available to the same decoder, for example, by tuning to a different RF channel or steering a dish to a different satellite. The System Information Table 310 may list a number of other transport streams and each one may have a descriptor that specifies the radio frequency, orbital position, and so on. System Information Table 310 provides information describing the overall system signal(s) of a specific television system 100.

Types of a System Information Table 310 include a Digital Video Broadcast (DVB) standard Network Information Table (NIT) and an Advanced Television Systems Committee (ATSC) standard System Information (SI) table. DVB and ATSC transport streams may also contain additional service information.

Those skilled in the art will appreciate that FIGS. 1–3 are intended to provide a brief, general description of a typical television system and MPEG encoded data, and that additional information is readily available from a variety of sources.

An Exemplary System for Dynamically Controlling the Rate of Insertion of Data Into an Outgoing Bit Stream The present invention provides adaptive rate control of data insertion into an outgoing bit stream. The system can accept an arbitrary MPEG bit stream and determine the properties of that incoming bit stream. The system then determines the available capacity for insertion of data into the MPEG bit stream and adjusts its operation based on the results. The insertion of data is done at a variable rate based on the available capacity, which varies in time. In an exemplary embodiment of the present invention, the invention is used to control the rate of insertion of MPEG table packets into an outgoing MPEG bit stream. However, the invention is not limited to MPEG data and can be used in conjunction with systems that use other types of data.

Figure 4:
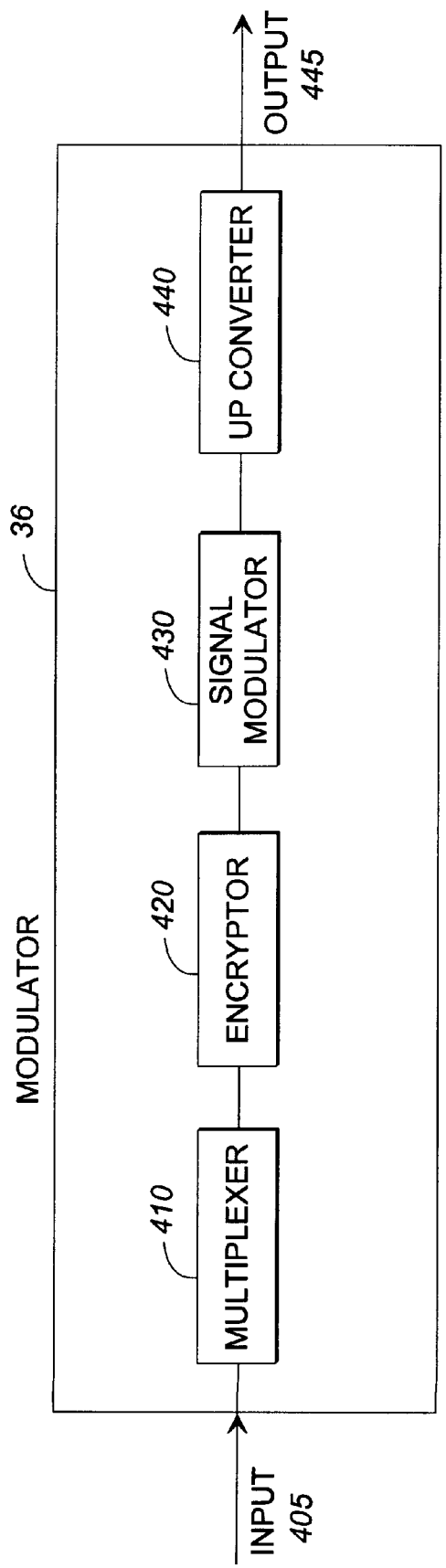
FIG. 4 is a block diagram representation of a modulator for modulating MPEG bit streams.

FIG. 4 is a block diagram of a modulator (such as modulator 36), which is located in headend 21 of television system 100 (FIG. 1), and which includes an embodiment of the present invention. The block diagram is a representation of a modulator for modulating MPEG transport stream 302 (FIG. 3). The modulator 36 includes a multiplexer 410 for receiving and modifying an input signal 405. Modifying the input signal 405 includes extracting incoming MPEG table information and inserting outgoing MPEG table packets, which are part of the present invention. In an exemplary embodiment the present invention is located within the multiplexer 410 of Modulator 36. The modulator 36 also includes an encryptor 420 for encrypting the bit stream, a signal modulator 430 for modulating the bit stream, and an up converter 440 for producing output 445.

Figure 5:
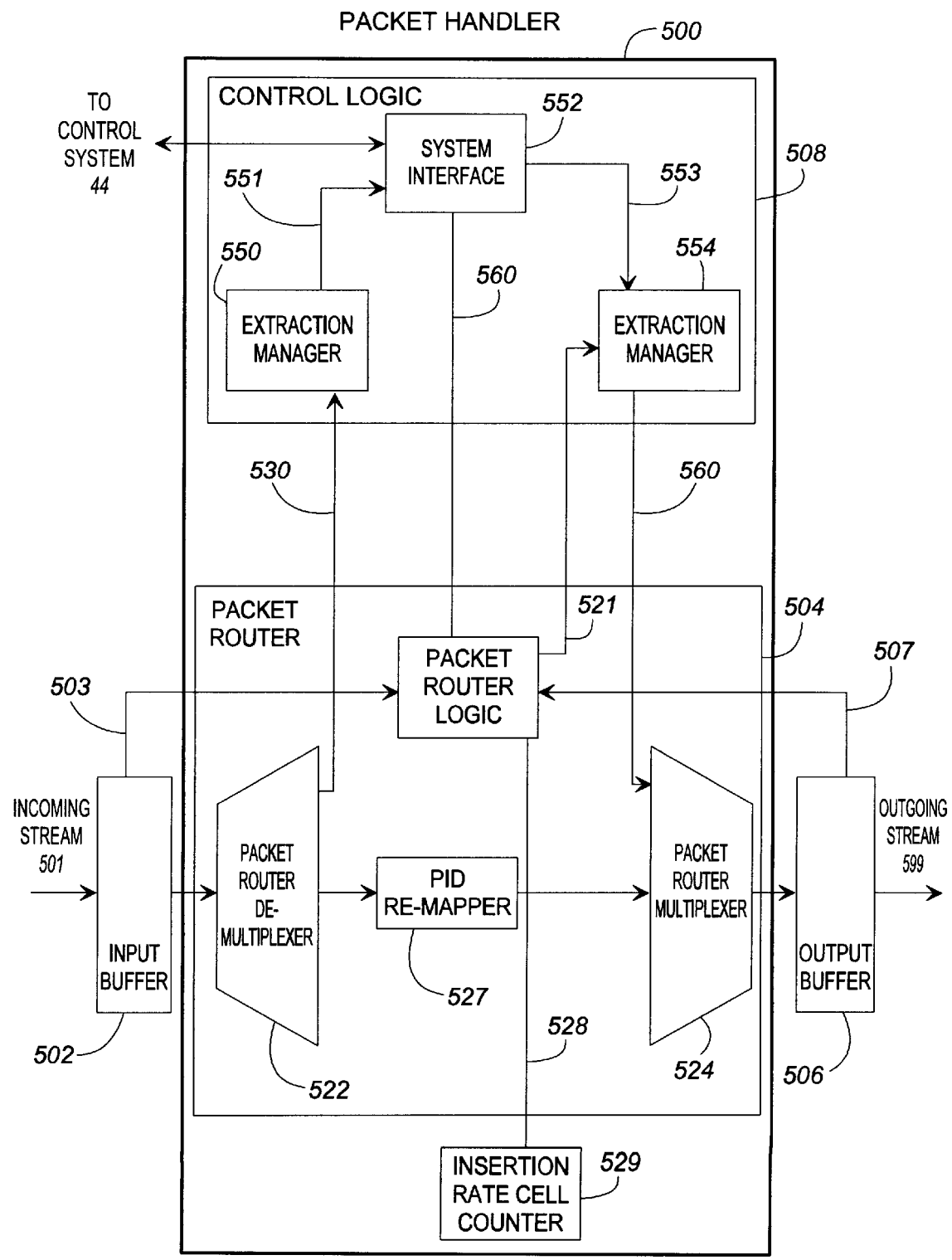
FIG. 5 is a block diagram representation of an input buffer, a packet handler, and an output buffer of the present invention, which forms a part of the modulator of FIG. 4.

FIG. 5 is a block diagram representation of an input buffer 502, a packet handler 500, and an output buffer 506, which are located within the multiplexer 410 of Modulator 36. Input buffer 502 and output buffer 506 provide staging, or a way of maintaining the fixed transmission rate of the bit stream, while the packet handler 500 extracts information from the incoming bit stream and inserts data into the outgoing bit stream. Packet handler 500 determines the capacity for insertion of and inserts MPEG table packets into an MPEG transport stream 302 (of FIG. 3).

Input buffer 502 receives the incoming bit stream 501 and transfers it to packet handler 500. The incoming bit stream 501 contains incoming overhead and content information. Incoming overhead contains information specific to the incoming bit stream, such as MPEG table packets, stuffing packets, and incoming conditional access packets. Content information includes programming information such as video packets, audio packets, and data packets. The MPEG table packets contain information specific to and describing the incoming bit stream 501. Packet handler 500 receives the incoming bit stream 501 from the input buffer 502, de-multiplexes it, and extracts the incoming MPEG table information. Packet handler 500 ignores the overhead after extracting the information contained therein.

The packet handler 500 determines the content of the outgoing MPEG table packets and the rate at which the table packets should be inserted into the outgoing bit stream. This determination is based on the information extracted from the MPEG tables in the incoming bit stream and on input from control system 44. The control system 44 provides information regarding the overall requirements of television system 100, including conditional access and information for tuning to additional programming in the system.

Depending on the amount of content that is included in the outgoing bit stream, it will not always be possible to insert the outgoing MPEG tables at the desired insertion rate. Outgoing MPEG table packets can have a desired insertion rate higher that exceeds the available capacity. Packet handler 500 determines the available capacity for insertion of the bit stream and adjusts the rate of insertion from the desired to an actual insertion rate. The adjustment can be done based on parameters such as the type of MPEG table to be inserted or the desired frequency of insertion. Packet handler 500 constantly monitors the available capacity for insertion of the bit stream and adjusts the actual insertion rates accordingly.

Packet handler 500 multiplexes the video packets, audio packets, and data packets with the outgoing MPEG table packets. Packet handler 500 transfers the outgoing bit stream 599 to output buffer 506.

The operations of the input buffer 502, packet handler 500, and output buffer 506 are described in greater detail below.

Input Buffer 502

The input buffer 502 is a First-In-First-Out (FIFO) buffer that receives an incoming bit stream 501. The incoming bit stream 501 can be a bit stream of fixed or varying rate from a multitude of different sources. The incoming bit stream 501 is buffered by the input buffer 502 before being transferred to the packet router 504, specifically to the packet router de-multiplexer 522. The information is read from the input buffer 502 at a rate that exceeds the average rate of input into the input buffer in order to empty the buffer. During normal operation the input buffer 502 remains at or near the empty state. The input buffer 502 is monitored by packet router 504, specifically packet router logic 520, which monitors parameters such as the input buffer capacity indicator via line 503.

Packet Handler 500

The packet handler 500 includes a packet router 504 and control logic 508. The components and operation of the packet router 504 and control logic 508 are described in more detail below.

Packet Router 504

The packet router 504 determines the properties of the incoming bit stream and, with control logic 508, determines the available capacity for insertion and adjusts the rate at which data is inserted into the bit stream. The packet router 504 multiplexes the data into the bit stream. In an exemplary embodiment, the packet router 504 also performs additional functions, such as PID re-mapping. Packet router 504 includes packet router de-multiplexer 522, packet router logic 520, and packet router multiplexer 524.

The packet router de-multiplexer 522, which forms a part of packet router 504, receives and de-multiplexes the incoming bit stream 501 into incoming overhead and content information. Incoming overhead includes information specific to incoming bit stream 501, such as incoming MPEG table packets, stuffing packets, and incoming conditional access information. Content information includes programming information such as video packets, audio packets, and data packets.

Packet router de-multiplexer 522 extracts incoming MPEG table information from the incoming overhead. The packet router de-multiplexer 522 sends the incoming MPEG table information to control logic 508, specifically to extraction manager 550, via line 530. The packet router de-multiplexer 522 ignores the incoming overhead after extracting the information contained therein.

The packet router de-multiplexer 522 sends the content information packets to packet router multiplexer 524. Prior to the content information reaching packet router multiplexer 524 other functions carried out by the packet router, such as PID re-mapping, may be performed on the content information packets.

Packet Identifier (PID) re-mapping would occur at PID re-mapper 527, of packet router 504. Television system 100 receives input from a multitude of input sources each with its own assignment and allocation of PIDs. One input source may assign PID 19 to audio packets, another may assign PID 19 to video packets. To eliminate the possibility of conflict in PID allocation, all PIDs are typically re-mapped to a format that is specific for television system 100.

The packet router de-multiplexer 522 is monitored by packet logic 520, which forms a part of packet router 504. The packet router logic 520 monitors parameters such as de-multiplexing rate and the capacity for de-multiplexing.

Figure 6:
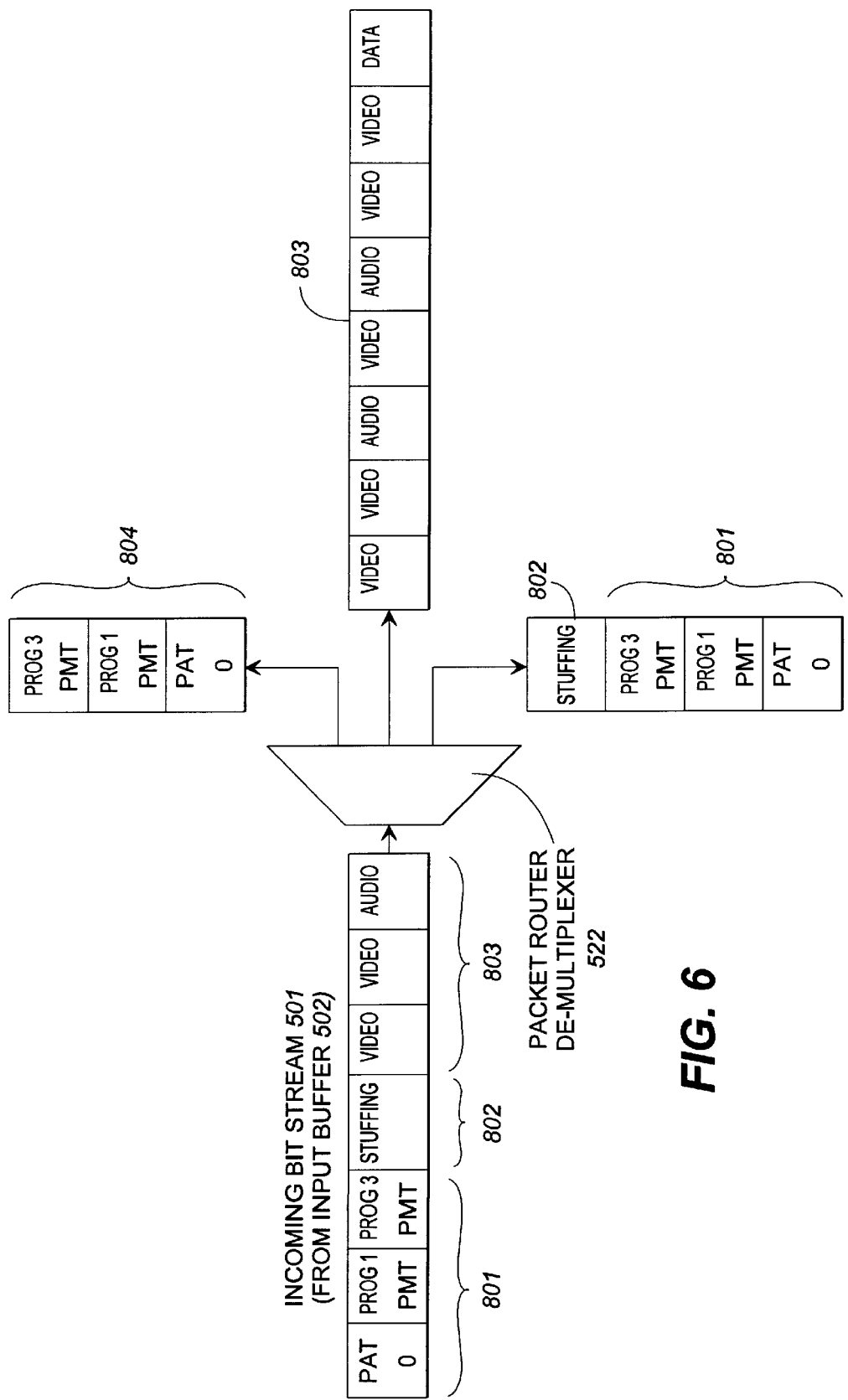
FIG. 6 is a graphic representation illustrating the de-multiplexing process performed by the packet router de-multiplexer of FIG. 5.

The packet router 500 de-multiplexing process is now described with reference to FIG. 5 and FIG. 6. Incoming bit stream 501, from input buffer 502, is de-multiplexed by packet router de-multiplexer 522 into incoming overhead and content information 803. The incoming overhead includes information specific to the incoming bit stream, such as MPEG table packets 801 and stuffing packets 802. Content information 803 includes programming information such as video packets, audio packets, and data packets. MPEG table information 804 extracted from incoming overhead is transferred to control logic 508. The incoming overhead packets are deleted, in the sense that they are not passed to the packet router multiplexer 524, after extraction of incoming MPEG table information 804. Those skilled in the art will appreciate that the concept of "deleting" the incoming overhead packets includes any action that effectively prevents them from being passed on to the packet router multiplexer, including overwriting the packet data with new data from the input buffer or replacing the packet with a stuffing packet. The packets that contain the content information 803 are transferred to other parts of packet router 504.

The packet router logic 520, which forms a part of packet router 504, ascertains the available capacity for insertion and monitors and directs the functioning of the packet router 504, input buffer 502, and output buffer 506. The packet router logic 520 has a variety of inputs, such as a desired insertion time from control logic 508, an input buffer 502 capacity indicator, an output buffer 506 capacity indicator, a packet router de-multiplexer 522 capacity indicator, and a timer.

In an exemplary embodiment of the present invention, packet router logic 520 determines the available capacity for insertion by monitoring the capacity of input buffer 502. The control logic's system interface 552 sets insertion times via line 560. At the set insertion time, the packet router logic 520 enables insertion by the control logic's insertion manager 554 via line 521. The packet router logic 520 delays enabling an insertion if the input buffer 502 is not empty. The input buffer 502 must become empty before an insertion is enabled. If the delay continues past the next set insertion time or if the packet router logic 520 is constantly delaying insertion, the control logic 508 adjusts the set insertion times.

Those skilled in the art will note the available capacity for insertion can be determined in a variety a ways and by a variety of components. The available capacity for insertion could be determined by: measuring the size or rate of the content information transferred between packet router de-multiplexer 522 and packet router multiplexer 524 and comparing the content information size or rate to the total fixed size or rate of outgoing bit stream 599. Alternatively, the available capacity for insertion could be determined at packet router multiplexer 524 based on the capacity of the overhead information. The determination of available capacity for insertion could also be done outside of and provided to packet handler 500.

The packet router logic 520 also monitors and directs the functioning of the packet router 504, input buffer 502, and output buffer 506. For example, the packet router logic 520 monitors the capacity of output buffer 506, which is constantly being emptied to maintain the fixed transmission rate of outgoing bit stream 599. If the output buffer 506 indicates it is full, via line 507, it is an error condition. The packet router logic 520 then instructs the packet router multiplexer 524 to not write to the output buffer 506 and instructs the packet router de-multiplexer 522 to leave incoming bit stream 501 in input buffer 502. The packet router logic 520 also instructs the control logic 508 to stop trying to insert data into the outgoing bit stream. The packet router logic 520 maintains this state until output buffer 506 clears.

A timer for determining insertion times is provided to the packet router logic 520 by insertion rate cell counter 529 via line 528. The insertion rate cell counter 529 can be a component of packet router 504, a component of packet handler 500, or located elsewhere.

The packet router multiplexer 524, which forms a part of packet router 504, "inserts" the MPEG table packets into the bit stream by multiplexing the content information from the packet router de-multiplexer 522 and the MPEG table packets provided by the insertion manager 554 into an outgoing bit stream 599. The packet router multiplexer 524 sends the multiplexed information to the output buffer 506.

Figure 7:
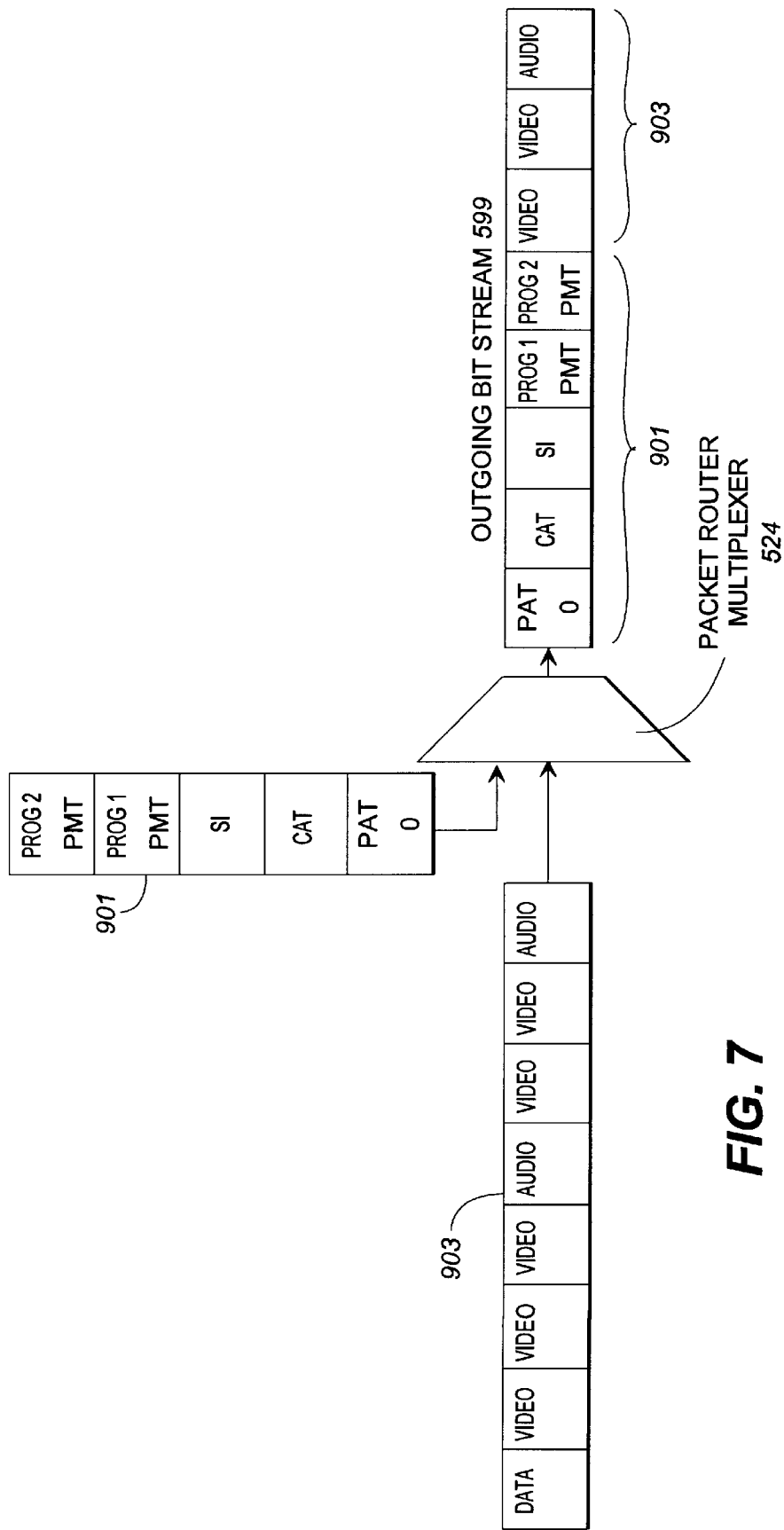
FIG. 7 is a graphic representation illustrating the multiplexing process performed by the packet router multiplexer of FIG. 5.

The multiplexing process performed by the packet router 500 is now described with reference to FIG. 5 and FIG. 7. The packet router multiplexer 524 receives content information packets 903 corresponding to content packets 803 (FIG. 6), which are provided by the packet router de-multiplexer 522. The content information packets 803 may have had other packet router-related functions, such as PID re-mapping, performed to thus produce content information packets 903. The content information packets 903 include programming information such as video packets, audio packets, and data packets. The MPEG table packets 901 are provided by the insertion manager 554, which forms a part of control logic 508. The packet router multiplexer 524 multiplexes the MPEG table packets 901 and content information packets 903 to produce the outgoing bit stream 599.

Control Logic 508

Referring again to FIG. 5, the control logic 508 creates the data to be inserted and, with the packet router 504, determines the available capacity for insertion, and adjusts the rate of insertion of data into the bit stream. The control logic 508 also provides an interface for the operator of television system 100 via control system 44. The control Logic 508 includes the extraction manager 550, system interface 552, and insertion manager 554.

Extraction manager 550, which forms a part of control logic 508, receives incoming data from packet router 504 via line 530. The incoming data is information, such as incoming MPEG table information, that is extracted by the packet router de-multiplexer 522 from the incoming overhead. The extraction manager 550 converts the MPEG table information to a compatible format for processing by the control logic 508. The extraction manager 550 provides the incoming information in an appropriate format to system interface 552 via line 551.

The system interface 552, which forms a part of control logic 508, receives the incoming information from the extraction manager and instructions from the control system 44, and provides outgoing information to the insertion manager 554. The control system 44 (of FIG. 1) provides instructions that indicate requirements of the specific television system 100, such as the type of equipment at subscriber location 50, conditional access control messages, and the current programming configuration such as a programming line-up. The control system 44 also provides instructions for changes to the system, such as changing the programming line-up or changing conditional access messages, and instructions on the method for adjusting the insertion rate of the data.

System interface 552 determines the outgoing information based on instructions from the control system 44 and preset parameters such as television system 100 specific PID allocations. The system interface 552 sends the outgoing information to insertion manager 554 via line 553. The outgoing information can include information needed to create PAT packets, CAT packets, SI packets, PMT packets, and packets containing other information.

The system interface 552 determines the desired insertion rate of the outgoing information using parameters such as the amount of outgoing information to be inserted, instructions from the control system 44, and the different types of outgoing information to be inserted. Based on the desired insertion rate, a desired insertion time is set and communicated to packet router logic 520 via line 560.

System interface 552 constantly monitors the functioning of the insertion manager 554. The system interface 552 adjusts the set insertion times if insertion is frequently delayed or if an insertion delay continues past the next set insertion time. The actual insertion rate and actual insertion time may be the same as the desired insertion rate and desired insertion time, respectively, if there are few delays. In an exemplary embodiment, the frequency and duration of insertion delays is used as a indicator of the available capacity for insertion. Adjustment of a set insertion time changes the rate of insertion from the desired insertion rate. The adjustment, described in greater detail below, is based on several parameters such as the type of MPEG table to be inserted or the desired frequency of insertion. For example, conditional access information may be a more important type of data than a PAT packets, and, as such, the actual insertion rate of PAT packets may be reduced to half of the desired rate of insertion to allow all conditional access information to be inserted.

The insertion manager 554 waits for an insert signal from the packet router logic via line 521. Upon receipt of an insert signal, the insertion manager 554 creates and sends outgoing data to the packet multiplexer 524. The outgoing data is created based on the content of the outgoing information received from the system interface 552 via line 553 and requirements specific to the television system 100 as received from the control system 44. The outgoing data can include PAT packets, CAT packets, SI packets, PMT packets, and packets containing other information.

Output Buffer 506

An output buffer 506 provides for staging of the outgoing bit stream 599. The output buffer 506 allows the outgoing bit stream 599 to be maintained at a prescribed data rate even if the rate at which the outgoing bit stream 599 is received from packet router 504 varies. The output buffer 506 is monitored by the packet router logic 520, which is part of the packet router 504. The packet router logic 520 monitors parameters such as the indication of output buffer capacity via line 507.

Figure 8:
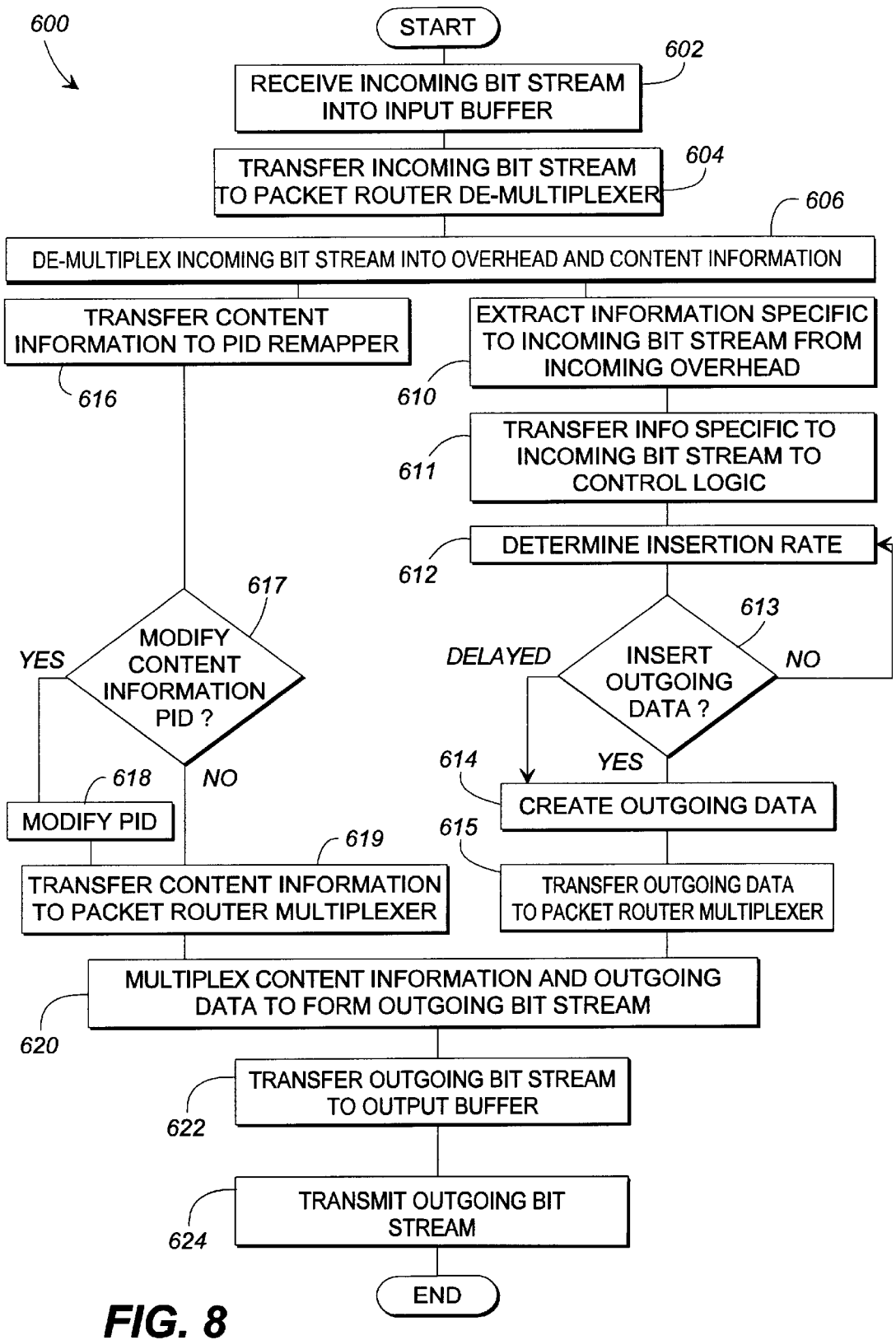
FIG. 8 is a flow diagram illustrating a method for determining the properties of an incoming bit stream and adjusting the variable rate insertion of data into a bit stream.

Determining the Properties of the Incoming Bit Stream and Adjusting the Rate of Data Insertion FIG. 8 is a flow diagram illustrating an exemplary method 600 by which the input buffer 502, packet handler 500, and output buffer 506 determine the properties of an incoming bit stream and, based on the results, adjust the rate of insertion of data into a bit stream. The input buffer 502 and output buffer 506 provide buffering or staging, which allows the system to maintain desired transmission rates for the incoming and outgoing bit streams while the packet handler 500 determines the properties of an incoming bit stream and inserts data into the outgoing bit stream. The packet handler 500 varies the rate of insertion of data into the outgoing bit stream based on the determined properties of the bit stream and the desired insertion rate of the outgoing data.

The method 600 begins at step 602 when the input buffer 502 receives the incoming bit stream 501 (FIG. 5). At step 604 the incoming bit stream is transferred from the input buffer 502 to the packet router de-multiplexer 522, which forms a part of packet handler 500. The capacity of the input buffer 502 is continuously monitored by the packet router logic 520.

At step 606 the packet router de-multiplexer 522 de-multiplexes the incoming bit stream 501 into incoming overhead and content information. For an MPEG bit stream, all incoming overhead information and content information would be included in transport stream packets 302. Incoming overhead includes information specific to incoming bit stream 501, such as incoming MPEG table packets, stuffing packets, and incoming conditional access information. Content information includes programming information such as video packets, audio packets, and data packets. The capacity of the de-multiplexer 522 is also monitored by the packet router logic 520.

Packet router logic 520 uses the input buffer 502 capacity and de-multiplexer 522 capacity for determining the available capacity for insertion of the data into the outgoing bit stream 599. To one skilled in the art, it will be obvious that other methods of determining the available capacity for insertion into the outgoing bit stream are possible, such as measuring the available capacity for insertion at the packet router multiplexer 524.

Information specific to the incoming bit stream is extracted from the incoming overhead information at step 610. The incoming overhead packets are ignored after the pertinent information is extracted from them. At step 611, the extracted information specific to the incoming bit stream is transferred to extraction manager 550 of control logic 508.

In step 612, control logic 508 and packet router 504 determine a desired data insertion rate for the outgoing data. The desired insertion rate is based on input to the packet handler 500 from the control system 44, the information specific to the incoming bit stream, and the data to be inserted into the outgoing bit stream. The control logic 508 then establishes an insertion time, which is set to establish and maintain the desired insertion rate for the outgoing data.

At the set insertion time (step 613) the packet router logic 520 determines whether to enable insertion of the data based on the bit stream's available capacity for insertion. In an exemplary embodiment, the available capacity for insertion is determined by several parameters, including the input buffer 502 capacity, the packet router de-multiplexer 522 capacity, the packet router multiplexer 524 capacity, and the output buffer 506 capacity, which are monitored by the packet router logic 520. For example, insertion is enabled at the set insertion time if the input buffer 502 capacity indicates the input buffer 502 is at or near empty. In addition, the control logic 508 sets and adjusts the insertion times. One skilled in the art will appreciate that the division of functionality between control logic 508 and the packet router logic 520 can vary based on efficiencies of design. In addition, determination of the available capacity for insertion can be accomplished in other ways and the present invention is not limited to the embodiment described above.

If insertion was enabled (Yes) at step 613, the method proceeds to step 614 and creates the outgoing data packet. The outgoing data packet is transferred to packet router multiplexer 524 in step 615.

If insertion was not enabled at step 613, it may just be delayed. Control logic 508 monitors the insertion. If insertion is enabled (Delayed) prior to the next set time for insertion, the method proceeds to step 614 and immediately creates the outgoing data. If the insertion is delayed past the next set time (No), the method returns to step 612, where it adjusts the insertion rate and determines a new set time for insertion. If insertion is constantly being delayed or is not being delayed very often, additional adjustments to the insertion rate are made. Thus, while the actual insertion rate can equal the desired insertion rate, it can also be reduced from the desired insertion rate. This dynamic process is constantly repeated for each type of data to be inserted to maximize achievement of the desired insertion rates for all outgoing data.

Returning to step 606, the processing of the content information, which results from the de-multiplexing of the incoming bit stream, will now be discussed. From step 606, the process proceeds to step 616 and transfers the content information to PID re-mapper 527. The transfer is at a rate that exceeds the rate of the incoming bit stream 501 in order to compensate for the delays in input buffer 502 and in the packet handler 500.

At step 617, the process determines whether the PIDs associated with the content information packets should be modified (i.e., remapped) before they are transferred to the packet router multiplexer. If PID re-mapping is required by the television system 100, the process proceeds to step 618 and remaps the content information packets' PIDs based on information provided by the control system 44. The re-mapped content information packets are then transferred to the packet router multiplexer 524 at step 619.

Returning to Step 617, if PID re-mapping is not required, the process goes directly to step 619 and transfers the content information packets to the packet router multiplexer 524.

After the content information packets and outgoing data packets are transferred to the packet router multiplexer at steps 619 and 615, the process goes to step 620. At this point, the outgoing data packets and the content information packets are multiplexed to form the outgoing bit stream. At step 622, the outgoing bit stream is transferred to the output buffer 506. At step 624, the output buffer 506 transmits the outgoing bit stream to the encryptor 420 (FIG. 4).

Insertion Rate Adjustments

Figure 9:
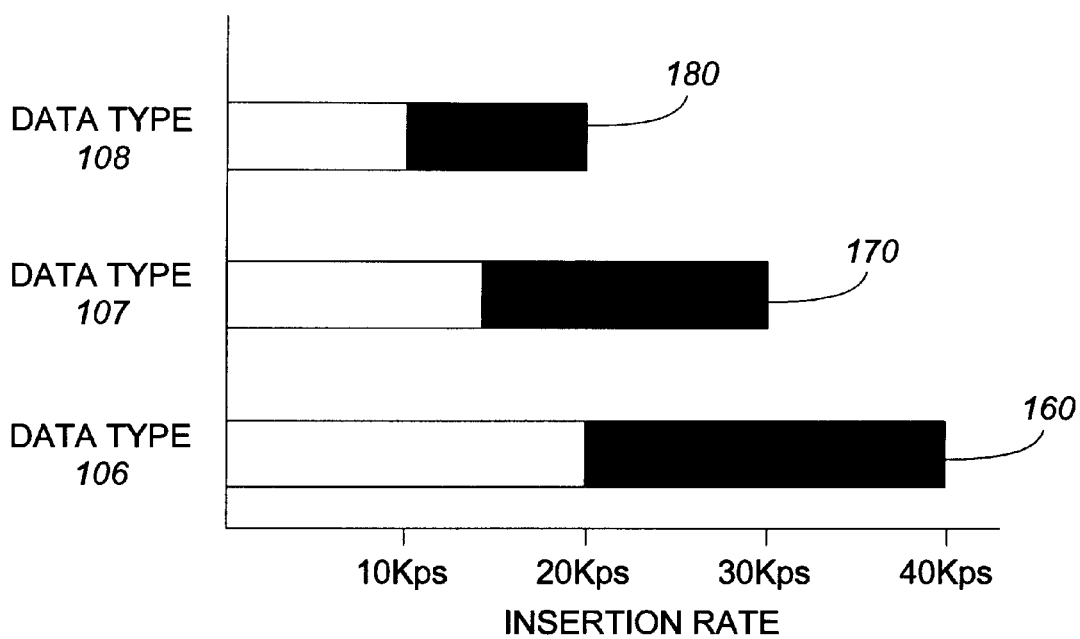
FIG. 9 is a graphic representation illustrating proportionally reducing the average insertion rate of multiple data types.
Figure 10:
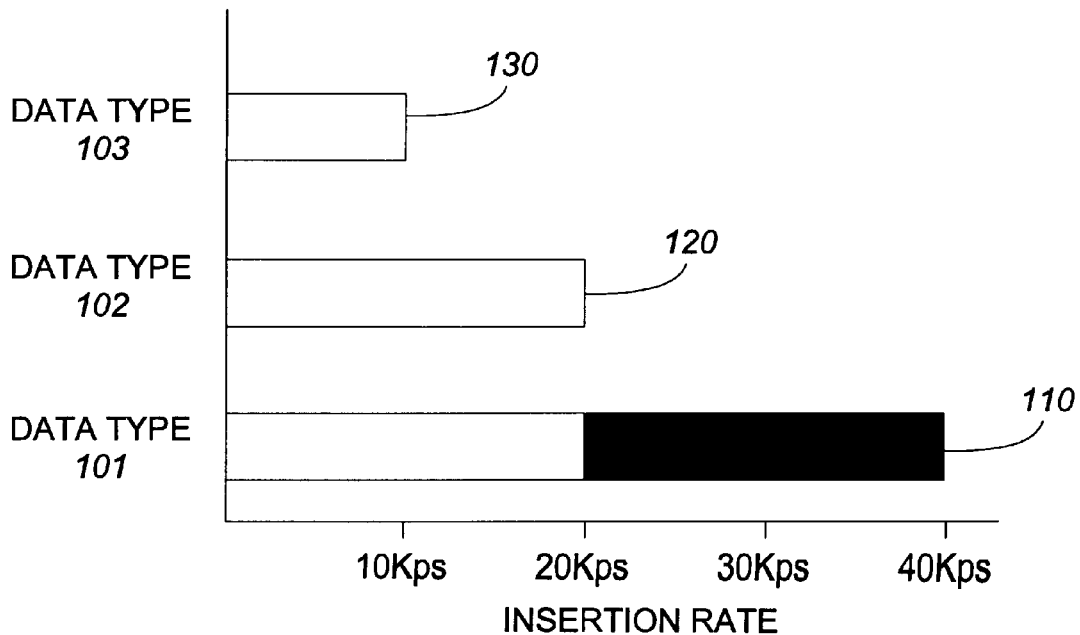
FIG. 10 is a graphic representation illustrating reducing the insertion rate of the data type having the highest data insertion rate.

As described above, the present invention adjusts the insertion rate based on several parameters, such as the type of data to be inserted and the desired frequency of data insertion. The insertion rate is referred to in terms of an average insertion rate of X kilobytes of data per second (Kbps). FIG. 9 illustrates a method for adjusting the frequency of insertion by proportionally reducing the insertion rate of all data. FIG. 10 illustrates a method for adjusting the insertion rate based on the type of data by reducing the insertion rate of data types with higher insertion rates first.

In the example illustrated in FIG. 9, the insertion rate must be adjusted to allow a total average insertion rate of 45 Kbps. The overall desired insertion rate is 90 Kbps, which includes a desired insertion rate of 40 Kbps for data type 106 (as shown by 160), a desired insertion rate of 30 Kbps for data type 107 (as shown by 170), and a desired insertion rate of 20 Kbps for data type 108 (as shown by 180). To achieve a total average insertion rate of 45 Kbps, the insertion rate of each data type is reduced proportionally by fifty percent. The desired insertion rate of 40 Kbps for data type 106 is thus reduced to an actual insertion rate of 20 Kbps. The reduction is indicated by the shaded region of 160. The desired insertion rate of 30 Kbps for data type 107 is thus reduced to an actual insertion rate of 15 Kbps. The reduction is indicated by the shaded region of 170. The desired insertion rate of 20 Kbps for data type 108 is thus reduced to an actual insertion rate of 10 Kbps. The reduction is indicated by the shaded region of 180. This proportional reduction allows an overall average insertion rate of 45 Kbps to be achieved.

In the example illustrated in FIG. 10, the insertion rate must be adjusted to allow a total average insertion rate of 50 Kbps. The overall desired insertion rate is 70 Kbps, which includes a desired insertion rate of 40 Kbps for data type 101 (as shown by 110), a desired insertion rate of 20 Kbps for data type 102 (as shown by 120), and a desired insertion rate of 10 Kbps for data type 103 (as shown by 130).

In an MPEG bit stream, the different data types represent different types of MPEG table packets. Adjusting the insertion rate by this method includes reducing the insertion rate of the table type with the highest data insertion rate first. The table type with the highest data insertion rate would be the one with the largest number of packets to be inserted within a given period of time.

Thus, based on adjusting the insertion rate by data type, data type 101, which has the highest desired insertion rate, is selected to be reduced first. The desired insertion rate of 40 Kbps for data type 101 is thus reduced to an actual insertion rate of 20 Kbps. The reduction is indicated by the shaded region of 110. The resultant overall average insertion rate has been reduced from the desired 70 Kbps to a total actual data insertion rate of 50 Kbps. In this example, data types 102 and 103 require no insertion rate reduction.

Multiple data types can be reduced based on data type (Not illustrated). If the allowed total average insertion rate in FIG. 10 was 40 Kbps of data, once data type 101 has been reduced to 20 Kbps, then data types 101 and data type 102 would the data types with the highest insertion rate (i.e., 20 Kbps). Reducing both data types to actual insertion rates of 15 Kbps achieves a total average insertion rate of 40 Kbps. The actual insertion rate of 40 Kbps includes 15 Kbps for data types 101 and 102 and 10 Kbps for datatype 103.

Conclusion

From the foregoing, it will be appreciated that the present invention provides a method for adaptively controlling the rate of data insertion into an outgoing bit stream. The method includes determining an available capacity for insertion of data into an outgoing bit stream and a desired insertion rate of said data into said outgoing bit stream. An actual insertion rate is then determined based on the available capacity for insertion and the desired insertion rate. The data is inserted into the outgoing bit stream at the actual insertion rate.

In an exemplary embodiment, the present invention is employed in a cable television system to adjust the rate of insertion of MPEG table packets in an outgoing MPEG bit stream. However, those skilled in the art will appreciate that the present invention may be employed in other types of television systems and in a variety of communications systems or networks. Similarly, the present invention is not limited to MPEG data and may be used with a variety of digital data formats. Those skilled in the art will also appreciate that the present invention need not be embodied in a modulator, but may be embodied at any data processing junction. For example, the present invention may reside in any equipment doing data processing, including other headend equipment, a computer, an HCT 52, a or TV 54.

The foregoing description describes a variety of techniques for determining the available capacity for insertion and for adjusting the rate of insertion of outgoing data. Those skilled in the art will appreciate that the present invention is not limited to the described techniques, and that a variety of techniques and processes may be developed to accomplish these tasks. For example, the available capacity for insertion could be determined by comparing the size of the content information to the total size of the outgoing bit stream In conclusion, while exemplary embodiments of the invention have been illustrated and described, it will be clear that the invention is not so limited. Numerous modifications, changes, variations, substitutions, and equivalents will occur to those skilled in the art, without departing from the spirit and scope of the present invention as defined by the appended claims.

What is claimed is:

1. A method for adaptively controlling the rate of data insertion into an outgoing bit stream, comprising the steps of:
    determining an available capacity for insertion of said data into said outgoing bit stream;
    determining a desired insertion rate of said data into said outgoing bit stream;
    determining an actual insertion rate of said data into said outgoing bit stream, wherein said actual insertion rate is based on said available capacity for insertion and said desired insertion rate; and
    inserting said data into said outgoing bit stream at said actual insertion rate.

2. The method of claim 1, wherein determining said available capacity for insertion comprises the steps of:
    receiving an incoming bit stream into an input buffer, said incoming bit stream including overhead and content;
    de-multiplexing said incoming bit stream to separate said overhead and said content;
    determining an input buffer capacity of said input buffer;
    determining a rate of said de-multiplexing; and
    ascertaining said available capacity for insertion based on said input buffer capacity of said input buffer and said rate of said de-multiplexing.

3. The method of claim 2, wherein said content is selected from a group comprising video packets, audio packets, and data packets.

4. The method of claim 1, wherein determining said available capacity for insertion comprises the steps of:
    receiving an incoming bit stream including overhead and content;
    de-multiplexing said incoming bit stream to separate said overhead and said content;
    deleting at least a portion of said overhead;
    determining an unused capacity in said incoming bit stream after deleting said at least a portion of said overhead; and
    ascertaining said available capacity for insertion based on said unused capacity.

5. The method of claim 4, wherein said content is selected from a group comprising video packets, audio packets, and data packets.

6. The method of claim 1, wherein determining said actual insertion rate comprises the steps of:
    setting said actual insertion rate equal to said desired insertion rate when said desired insertion rate is less than or equal to said available capacity for insertion; and
    reducing said actual insertion rate to equal said available capacity when said desired insertion rate is greater than said available capacity for insertion.

7. The method of claim 1, wherein determining said actual insertion rate comprises the steps of:
    establishing a set insertion time for said data;
    determining if said data can be inserted in said outgoing bit stream at said set insertion time;
    setting said actual insertion rate equal to said desired insertion rate when said data can be inserted at said set insertion time; and
    reducing said actual insertion rate when said set insertion time is unavailable.

8. The method of claim 7, wherein determining if a said data can be inserted in said outgoing bit stream at said set insertion time comprises the steps of:
    establishing a plurality of said set insertion times;
    establishing an actual insertion time when said data can be inserted in said outgoing bit stream, wherein said actual insertion time is:
        equal to a first said set insertion time when insertion is enabled at said first set insertion time,
        equal to an enabled time when said insertion is enabled after said first set insertion time and before a second said set insertion time,
        canceled when insertion is enabled after said second set insertion time; and
    determining a new insertion rate when said actual insertion time is delayed past a second said set insertion time.

9. The method of claim 1, wherein said data comprises a plurality of data types, each of said data types having a desired data type insertion rate, and wherein, when said available capacity is less than said desired insertion rate, calculating said actual insertion rate based on a proportional reduction of each of said desired data type insertion rates, whereby said actual insertion rate is less than or equal to said available capacity.

10. The method of claim 1, wherein said data comprises a plurality of data types, each of said data types having a desired data type insertion rate, and wherein, when said available capacity is less than said desired insertion rate, calculating said actual insertion rate based on a reduction of the highest of said desired data type insertion rates, whereby said actual insertion rate is less than or equal to said available capacity.

11. A method for adaptively controlling the rate of outgoing MPEG table packet insertion into an outgoing MPEG bit stream, comprising the steps of:
    receiving an incoming MPEG bit stream into an input buffer;

de-multiplexing said incoming MPEG bit stream;

determining available capacity for insertion into said outgoing MPEG bit stream;

determining a desired rate of insertion of said outgoing MPEG table packets into said outgoing MPEG bit stream;

determining an actual rate of insertion of said outgoing MPEG table packets into said outgoing MPEG bit stream based on said available capacity and said desired rate;

creating said outgoing MPEG table packets; and inserting said outgoing MPEG table packets into said outgoing MPEG bit stream at said actual rate of insertion, wherein said outgoing MPEG bit stream includes at least a portion of said incoming MPEG bit stream.

12. The method of claim 11, wherein de-multiplexing said incoming MPEG bit stream comprises separating said incoming MPEG bit stream into video packets, audio packets, data packets, stuffing packets, incoming MPEG table packets, and other information.

13. The method of claim 11, wherein determining said available capacity for insertion comprises the steps of:

determining an input buffer capacity in said input buffer;

determining a rate of said de-multiplexing; and ascertaining said available capacity for insertion based on said input buffer capacity in said input buffer and said rate of said de-multiplexing.

14. The method of claim 11, wherein determining said available capacity for insertion comprises the steps of:

deleting at least a portion of said incoming MPEG bit stream;

determining an unused capacity in said incoming MPEG bit stream after deleting at least a portion of said incoming MPEG bit stream; and ascertaining said available capacity for insertion based on said unused capacity.

15. The method of claim 14, wherein deleting at least a portion of said incoming MPEG bit stream comprises the step of deleting at least a portion of stuffing packets, at least a portion of said other information, and at least a portion of incoming MPEG table packets.

16. The method of claim 11, wherein said determining an actual rate of insertion of said outgoing MPEG table packets into an outgoing MPEG bit stream comprises the steps of:

setting said actual insertion rate equal to said desired insertion rate when said desired insertion rate is less than or equal to said available capacity for insertion; and reducing said actual rate of insertion when said desired insertion rate is greater than said available capacity for insertion.

17. The method of claim 11, wherein determining said actual rate of insertion of said outgoing MPEG table packets into an outgoing MPEG bit stream comprises the steps of:

establishing a set insertion time for each of said outgoing MPEG table packets;

determining if a said outgoing MPEG table packet can be inserted in said outgoing MPEG bit stream at said set insertion time; and ascertaining an actual rate of insertion of said outgoing MPEG table packets into said outgoing MPEG bit stream, such that when said outgoing MPEG packet can be inserted at said set insertion time, said actual rate of insertion equals said desired rate of insertion, and when said insertion time is unavailable, reducing said actual rate of insertion.

18. The method of claim 17, wherein determining if a said outgoing MPEG table packet can be inserted in said outgoing MPEG bit stream at said set insertion time comprises the steps of:

establishing a plurality of said set insertion times for inserting a plurality of each of said outgoing MPEG table packet;

establishing an actual insertion time when said outgoing MPEG table packet can be inserted in said outgoing bit stream, wherein said actual insertion time is:

equal to a first said set insertion time when insertion is enabled at said first set insertion time, equal to an enabled time when said insertion is enabled after said first set insertion time and before a second said set time, canceled when insertion is enabled after said second set insertion time; and determining a new insertion rate when said actual insertion time is delayed past a second said set insertion time.

19. The method of claim 11, wherein said outgoing MPEG table packets comprise a plurality of table types, each of said table types having a desired table type insertion rate, and wherein, when said available capacity is less than said desired insertion rate, calculating said actual insertion rate based on a proportional reduction of each of said desired table type insertion rates, whereby said actual insertion rate is less than or equal to said available capacity.

20. The method of claim 11, wherein said MPEG table packets comprise a plurality of table types, each of said table types having a desired table type insertion rate, and wherein, when said available capacity is less than said desired insertion rate, calculating said actual insertion rate based on a reduction of the highest of said desired table type insertion rates, whereby said actual insertion rate is less than or equal to said available capacity.

21. The method of claim 11, wherein said creating said MPEG table packets includes information specific to said outgoing MPEG bit stream and at least a portion of incoming MPEG table information, wherein said incoming MPEG table information is created from incoming MPEG table packets in said incoming MPEG bit stream.

22. A method for adaptively controlling the rate of insertion of outgoing MPEG table packets into an outgoing MPEG bit stream, comprising the steps of:

receiving an incoming MPEG bit stream, said incoming MPEG bit stream including video packets, audio packets, data packets, incoming MPEG table packets, and information specific to said incoming MPEG bit stream;

de-multiplexing said incoming MPEG bit stream to separate said video packets, said audio packets, said data packets, said incoming MPEG table packets, and said information specific to said incoming MPEG bit stream;

analyzing said incoming MPEG table packets to produce incoming MPEG table information;

determining a desired rate of insertion of said outgoing MPEG table packets into said outgoing MPEG bit stream;

establishing an initial set insertion time for each of said outgoing MPEG table packets, based on said desired rate of insertion;

determining if a said outgoing MPEG packet can be inserted in said outgoing MPEG bit stream at said initial set insertion time;

determining an actual rate of insertion of said outgoing MPEG table packets into said outgoing MPEG bit stream, such that when said outgoing MPEG packet can be inserted at said initial set insertion time, said actual rate of insertion equals said desired rate of insertion, and when said outgoing MPEG packet cannot be inserted at said initial set insertion time, reducing said actual rate of insertion;

establishing an actual set insertion time for each of said outgoing MPEG table packets, based on said actual rate of insertion;

creating, based on said actual set insertion time, said outgoing MPEG table packets, said outgoing MPEG table packets including at least a portion of said incoming MPEG table information and information specific to said outgoing MPEG bit stream; and inserting said outgoing MPEG table packets into said outgoing MPEG bit stream containing said video packets, said audio packets, and said data packets.

23. The method of claim 22, wherein determining if a said outgoing MPEG packet can be inserted in said outgoing MPEG bit stream at said initial set insertion time comprises the steps of:

establishing a plurality of said set insertion times for inserting a plurality of said outgoing MPEG table packet;

establishing an actual insertion time when said outgoing MPEG table packet can be inserted in said outgoing bit stream, wherein said actual insertion time is:

equal to a first said set insertion time when insertion is enabled at said first set insertion time, equal to an enabled time when said insertion is enabled after said first set insertion time and before a second said set time, canceled when insertion is enabled after said second set insertion time; and determining a new insertion rate when said actual insertion time is delayed past a second said set insertion time.

24. The method of claim 22, wherein determining said actual rate of insertion of said outgoing MPEG table packets into an outgoing MPEG bit stream further comprises the step of:

wherein said outgoing MPEG table packets comprise a plurality of table types, each of said table types having a desired table type insertion rate, and wherein, when said outgoing MPEG packet cannot be inserted at said initial set insertion time, calculating said actual insertion rate is based on a proportional reduction of each of said desired table type insertion rates.

25. The method of claim 22, wherein determining said actual rate of insertion of said outgoing MPEG table packets into an outgoing MPEG bit stream further comprises the step of:

wherein said outgoing MPEG table packets comprise a plurality of table types, each of said table types having a desired table type insertion rate, and wherein, when said outgoing MPEG packet cannot be inserted at said initial set insertion time, calculating said actual insertion rate is based on a reduction of the highest of said desired table type insertion rates.

26. An apparatus for adaptively controlling the rate of insertion of outgoing MPEG table packets into an outgoing MPEG bit stream, comprising:

an input buffer for receiving an incoming MPEG bit stream;

an output buffer for buffering said outgoing MPEG bit stream; and a packet handler operative to determine and adjust said rate of insertion of said outgoing MPEG table packets into said outgoing MPEG bit stream, route MPEG packets from said input buffer to said output buffer to form said outgoing MPEG bit stream, and insert said outgoing MPEG table packets into said outgoing MPEG bit stream at said insertion rate.

27. The apparatus of claim 26, wherein said packet handler comprises:

a packet router for routing said MPEG packets and for insert said outgoing MPEG table packets; and control logic for creating said outgoing MPEG table packets.

28. The apparatus of claim 27, wherein said packet router comprises:

a de-multiplexer for de-multiplexing said incoming MPEG bit stream;

means for extracting incoming MPEG table information from incoming MPEG table packets in said incoming MPEG bit stream;

packet router logic operative to determine an available capacity for insertion of said outgoing MPEG bit stream; and a multiplexer for inserting said MPEG table packets into said outgoing MPEG bit stream and sending said outgoing MPEG bit stream to said output buffer.

29. The apparatus of claim 27, wherein said control logic comprises:

means for determining a desired rate of insertion of said MPEG table packets into said outgoing MPEG bit stream and to allow system specific information for said outgoing MPEG bit stream to be input; and means for determining an actual rate of insertion of said outgoing MPEG table packets into said outgoing MPEG bit stream, based on an available capacity and said desired rate, and for creating said outgoing MPEG table packets based on said incoming MPEG table information and system specific information for said outgoing MPEG bit stream.

30. The apparatus of claim 26, wherein said outgoing MPEG table packets comprise a plurality of table types, each of said table types having a actual table type insertion rate, wherein said packet handler is operative to adjust an insertion rate of said outgoing MPEG table packets into said outgoing MPEG bit stream by proportionally reducing each of said actual table type insertion rates.

31. The apparatus of claim 26, wherein said outgoing MPEG table packets comprise a plurality of table types, each of said table types having a actual table type insertion rate, wherein said packet handler is operative to adjust an insertion rate of said outgoing MPEG table packets into said outgoing MPEG bit stream by first reducing the highest of said actual table type insertion rates.

32. A system for adaptively controlling the rate of insertion of data into an outgoing bit stream based on an available capacity for insertion, comprising:

an input source for providing a signal;

equipment for encoding the signal into a bit stream;

means for determining an available capacity for insertion of said data into said bit stream means for determining a desired insertion rate of said data;

means for varying the actual insertion rate of said data, based on said available capacity for insertion of said data into said bit stream and said desired insertion rate of said data;

a distribution system for transmitting said bit stream; and equipment for decoding said bit stream into a form usable by a system subscriber.

33. The system of claim 32, wherein said equipment for encoding the signal into a bit stream is operative to, determine an available capacity for insertion of said data into said bit stream;

determine a desired insertion rate of said data; and vary the actual insertion rate of said data, based on said available capacity for insertion of said data into said bit stream and said desired insertion rate of said data.

34. The system of claim 32, wherein said distribution system for transmitting said bit stream is operative to, determine an available capacity for insertion of said data into said bit stream;

determine a desired insertion rate of said data; and vary the actual insertion rate of said data, based on said available capacity for insertion of said data into said bit stream and said desired insertion rate of said data.

35. The system of claim 32, wherein said equipment for decoding said bit stream into a form usable by a system subscriber is operative to, determine an available capacity for insertion of said data into said bit stream;

determine a desired insertion rate of said data; and vary the actual insertion rate of said data, based on said available capacity for insertion of said data into said bit stream and said desired insertion rate of said data.

* * * * *